(12) United States Patent
Doerr et al.

(10) Patent No.: US 10,078,190 B2
(45) Date of Patent: Sep. 18, 2018

(54) MULTI-CORE OPTICAL CABLE TO PHOTONIC CIRCUIT COUPLER

(75) Inventors: Christopher Doerr, Middletown, NJ (US); Peter Winzer, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 1210 days.

(21) Appl. No.: 13/012,693

(22) Filed: Jan. 24, 2011

(65) Prior Publication Data

US 2012/0155806 A1 Jun. 21, 2012

Related U.S. Application Data

(63) Continuation-in-part of application No. 12/972,667, filed on Dec. 20, 2010, now abandoned.

(51) Int. Cl.
G02B 6/42 (2006.01)
G02B 6/293 (2006.01)
G02B 6/30 (2006.01)
G02B 6/43 (2006.01)
G02B 6/34 (2006.01)
G02B 6/12 (2006.01)

(52) U.S. Cl.
CPC ....... *G02B 6/4249* (2013.01); *G02B 6/29323* (2013.01); *G02B 6/30* (2013.01); *G02B 6/34* (2013.01); *G02B 6/43* (2013.01); *G02B 2006/12107* (2013.01)

(58) Field of Classification Search
USPC .......................................... 385/37; 427/163.2
See application file for complete search history.

(56) References Cited

U.S. PATENT DOCUMENTS

| 5,469,518 | A | * | 11/1995 | Song | G02B 6/43 385/37 |
| 6,084,050 | A | * | 7/2000 | Ooba et al. | 528/42 |
| 6,317,443 | B1 | * | 11/2001 | Craig et al. | 372/38.04 |
| 6,343,171 | B1 | * | 1/2002 | Yoshimura | G02B 6/12002 257/E23.01 |
| 6,411,746 | B1 | * | 6/2002 | Chamberlain et al. | 385/2 |
| 6,501,872 | B2 | * | 12/2002 | Augustsson | 385/24 |
| 6,611,635 | B1 | * | 8/2003 | Yoshimura | G02B 6/12002 257/E23.01 |
| 6,647,177 | B1 | * | 11/2003 | Hwang et al. | 385/24 |

(Continued)

FOREIGN PATENT DOCUMENTS

| WO | 2008122607 A1 | 10/2008 |
| WO | 2010080157 A1 | 7/2010 |

OTHER PUBLICATIONS

Zhu, B., et al., "Seven-core multicore fiber transmissions for passive optical network," Opt. Express 18, 11117-11122 (2010).

(Continued)

*Primary Examiner* — Andrew Jordan
(74) *Attorney, Agent, or Firm* — Parker Justiss, P.C.

(57) ABSTRACT

An optical device includes an array of optical grating couplers and a plurality of single-core fiber couplers located over a planar substrate. The optical grating couplers of the array are located to optically couple in a one-to-one manner to optical cores of a multi-core fiber or optical cable having an end located adjacent to the surface. Each single-core fiber coupler includes a planar optical waveguide connecting a corresponding one of the optical couplers of the array to an edge of the substrate.

25 Claims, 11 Drawing Sheets

(56) References Cited

U.S. PATENT DOCUMENTS

| | | | |
|---|---|---|---|
| 6,684,007 B2* | 1/2004 | Yoshimura | G02B 6/10 257/E23.01 |
| 6,690,845 B1* | 2/2004 | Yoshimura | G02B 6/12002 257/E23.01 |
| 6,696,917 B1 | 2/2004 | Heitner et al. | |
| 6,706,546 B2* | 3/2004 | Yoshimura | G02B 6/10 257/E23.01 |
| 6,778,251 B1* | 8/2004 | Austin et al. | 349/201 |
| 6,785,447 B2* | 8/2004 | Yoshimura | G02B 6/10 257/E23.01 |
| 6,845,184 B1* | 1/2005 | Yoshimura | G02B 6/12002 257/E23.01 |
| 6,934,436 B2* | 8/2005 | Tapalian et al. | 385/16 |
| 7,268,927 B2* | 9/2007 | Wildeman et al. | 359/3 |
| 7,565,084 B1* | 7/2009 | Wach | 398/201 |
| 7,901,870 B1* | 3/2011 | Wach | 430/321 |
| 7,965,949 B1* | 6/2011 | Wach | 398/200 |
| 8,521,038 B1* | 8/2013 | Wach | 398/200 |
| 2002/0006249 A1* | 1/2002 | Augustsson | 385/24 |
| 2002/0028045 A1* | 3/2002 | Yoshimura | G02B 6/10 385/50 |
| 2002/0039464 A1* | 4/2002 | Yoshimura | G02B 6/10 385/14 |
| 2002/0097962 A1* | 7/2002 | Yoshimura | G02B 6/10 385/50 |
| 2003/0152313 A1* | 8/2003 | Tapalian et al. | 385/16 |
| 2003/0179788 A1* | 9/2003 | Wildeman et al. | 372/20 |
| 2003/0198438 A1* | 10/2003 | Wang et al. | 385/39 |
| 2003/0206690 A1* | 11/2003 | Hwang et al. | 385/24 |
| 2004/0076359 A1* | 4/2004 | Takahashi et al. | 385/14 |
| 2004/0184156 A1 | 9/2004 | Gunn, III et al. | |
| 2006/0198575 A1* | 9/2006 | Doerr et al. | 385/18 |
| 2006/0239612 A1* | 10/2006 | De Dobbelaere | G02B 6/4214 385/37 |
| 2008/0107386 A1* | 5/2008 | Kudou et al. | 385/126 |
| 2009/0180734 A1* | 7/2009 | Fiorentino et al. | 385/31 |
| 2009/0236510 A1 | 9/2009 | Lacroix et al. | |
| 2010/0110443 A1* | 5/2010 | Cheben | G01J 3/02 356/454 |
| 2012/0155805 A1* | 6/2012 | Doerr | 385/37 |
| 2012/0155806 A1* | 6/2012 | Doerr et al. | 385/37 |
| 2012/0170933 A1* | 7/2012 | Doerr et al. | 398/48 |

OTHER PUBLICATIONS

Thomson, R.R., et al., "Ultrafast laser inscription of a three dimensional fan-out device for multicore fiber coupling applications," CLEO 2008, JWA62.

Thomson, R.R., et al., "Ultrafast-laser inscription of a three dimensional fan-out device for multicore fiber coupling applications," Optics Express, vol. 15, Issue 18, pp. 11691-11697 (2007).

Wang, Zhechao, et al., "Experimental Demonstration of a High Efficiency Polarization Splitter Based on a One-Dimensional Grating with a Bragg Reflector Underneath", IEEE Photonics Technology Letters, vol. 22, No. 21, Nov. 1, 2010, pp. 1568-1570.

Wang, Zhechao, et al., "Experimental Demonstration of an ultracompact Polarization Beam Splitter Based on a Bidirectional Grating Coupler", 2009 OSA/ACP 2009, 2 pages.

Maier, Guido, et al., Optical-Switch Benes Architecture based on 2-D MEMS, 2006 IEEE, 6 pages.

Tang, Yongbo, et al., "Proposal for a Grating Waveguide Serving as Both a Polarization Splitter and an Efficient Coupler for Silicon-on-Insulator Nanophotonic Circuits"; IEEE Photonics Technology Letters, vol. 21, No. 4, Feb. 15, 2009, pp. 242-244.

Taillaert, Dirk, et al., "A Compact Two-Dimensional Grating Coupler Used as a Polarization Splitter", IEEE Photonics Technology Letters, vol. 15, No. 9 Sep. 2003, pp. 1249-1251.

Doerr, Christopher R., et al., "Monolithic Polarization and Phase Diversity Coherent Receiver in Silicon"; Journal of Lightwave Technology, 2010 IEEE, pp. 520-525.

OCC—Optical Cable Corporation, Fiber Optic Cable Indoor/outdoor & Premises, 2010, 27 pages.

* cited by examiner

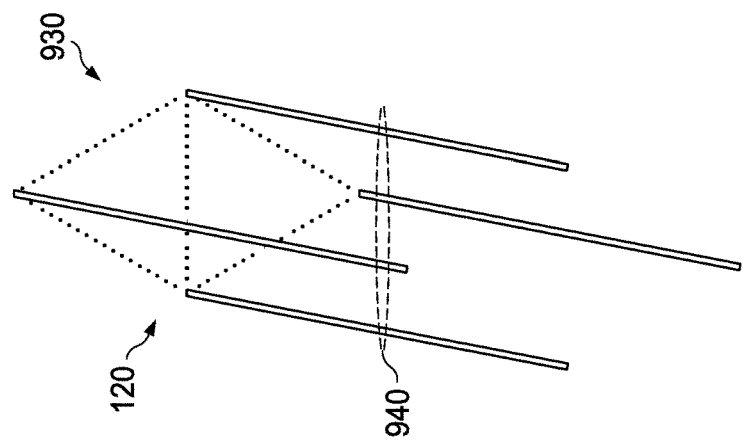
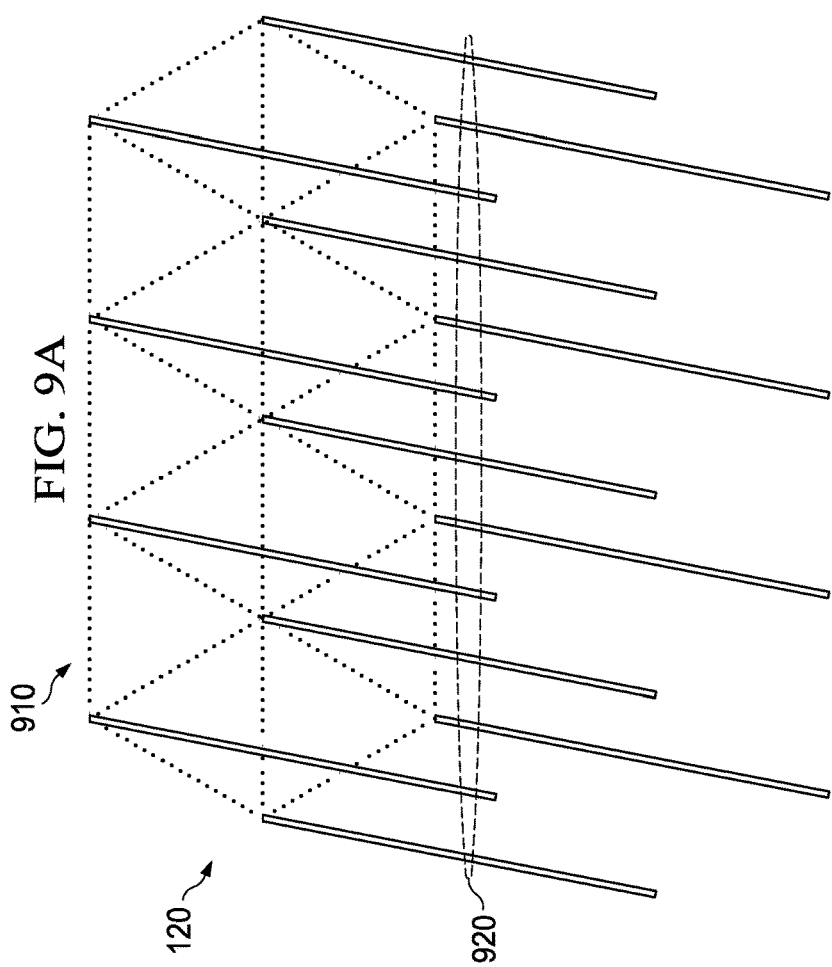

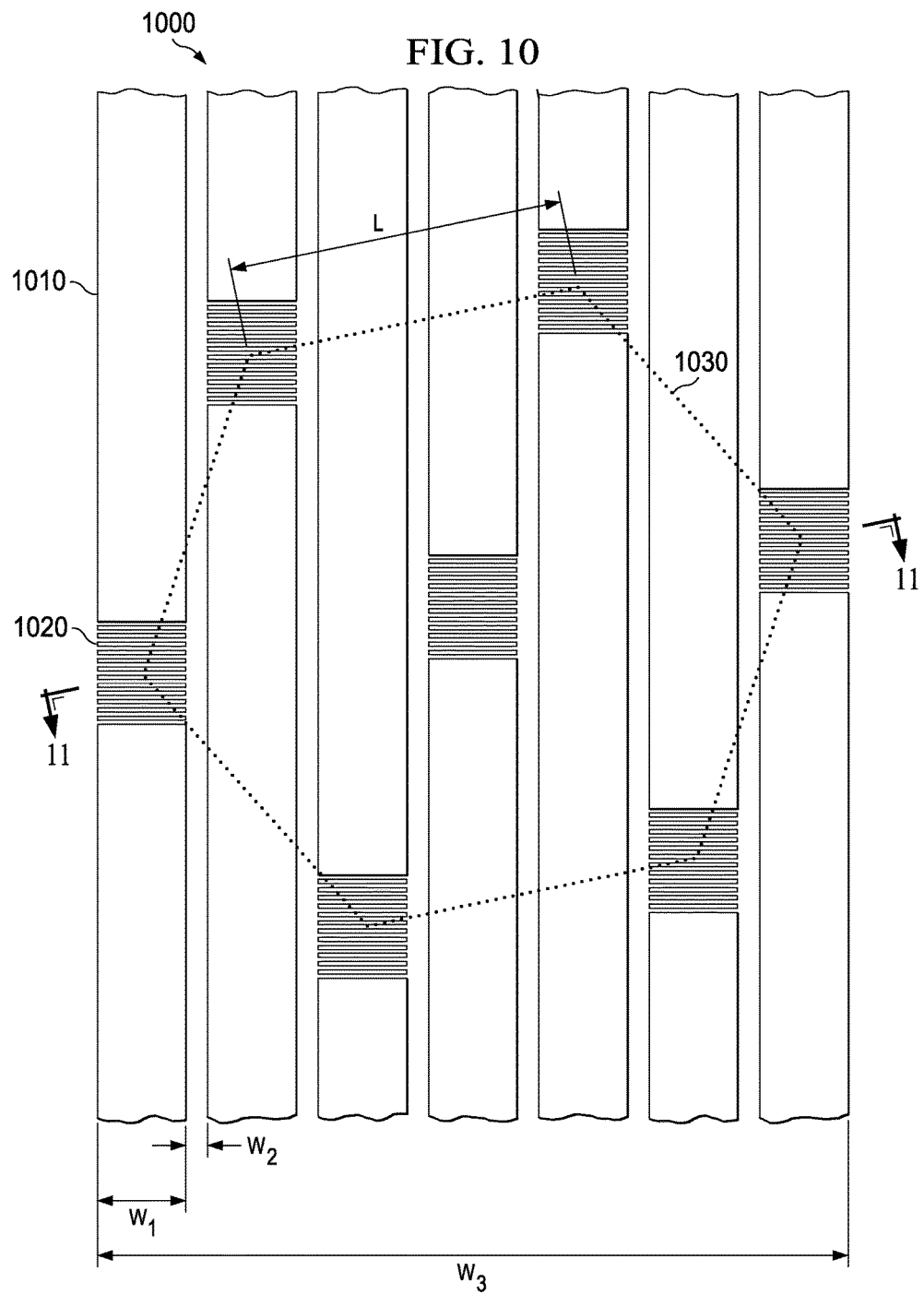

MULTI-CORE OPTICAL CABLE TO PHOTONIC CIRCUIT COUPLER

CROSS REFERENCE RELATED APPLICATION

This application is a continuation-in-part of U.S. application Ser. No. 12/972,667 filed on Dec. 20, 2010, now abandoned commonly assigned with the present invention and incorporated herein by reference in its entirety.

TECHNICAL FIELD

This application is directed, in general, to optical couplers and methods and systems that use or manufacture optical couplers.

BACKGROUND

Integrated photonic devices (IPDs) are analogous to integrated electronic circuits, providing multiple optical functions on a single substrate. While currently relatively simple, IPDs have the potential to achieve greater integration levels. As more optical functions are integrated, an increasingly large number of optical inputs to and outputs from the IPD may be needed.

SUMMARY

One aspect provides an optical device. The optical device includes an array of optical grating couplers and a plurality of single-core fiber couplers located over a planar substrate. The optical grating couplers of the array are located to optically couple in a one-to-one manner to optical cores of a multi-core fiber or optical cable having an end located adjacent to the surface. Each single-core fiber coupler includes a planar optical waveguide connecting a corresponding one of the optical couplers of the array to an edge of the substrate.

Another aspect provides a method. The method includes forming a multi-core fiber coupler and a plurality of single-core fiber couplers over a planar surface of a substrate. The multi-core fiber coupler includes an integrated array of optical grating couplers. Each grating coupler of the array is located in the array to optically couple to a corresponding optical core of a multi-core fiber or optical cable having an end facing and adjacent to the planar surface. Each single-core fiber coupler includes a planar optical waveguide located over the surface and connects a corresponding one of the optical grating couplers to an edge of the substrate.

BRIEF DESCRIPTION

Reference is now made to the following descriptions taken in conjunction with the accompanying drawings, in which.

Figure 1:
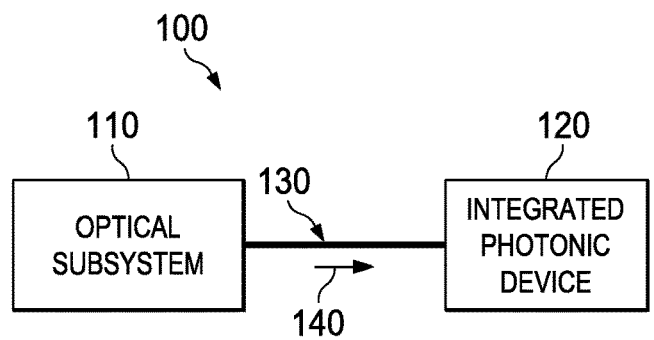
FIG. 1 illustrates an optical system including an optical subsystem, a multi-core optical fiber, and an integrated photonic device.
Figure 2:
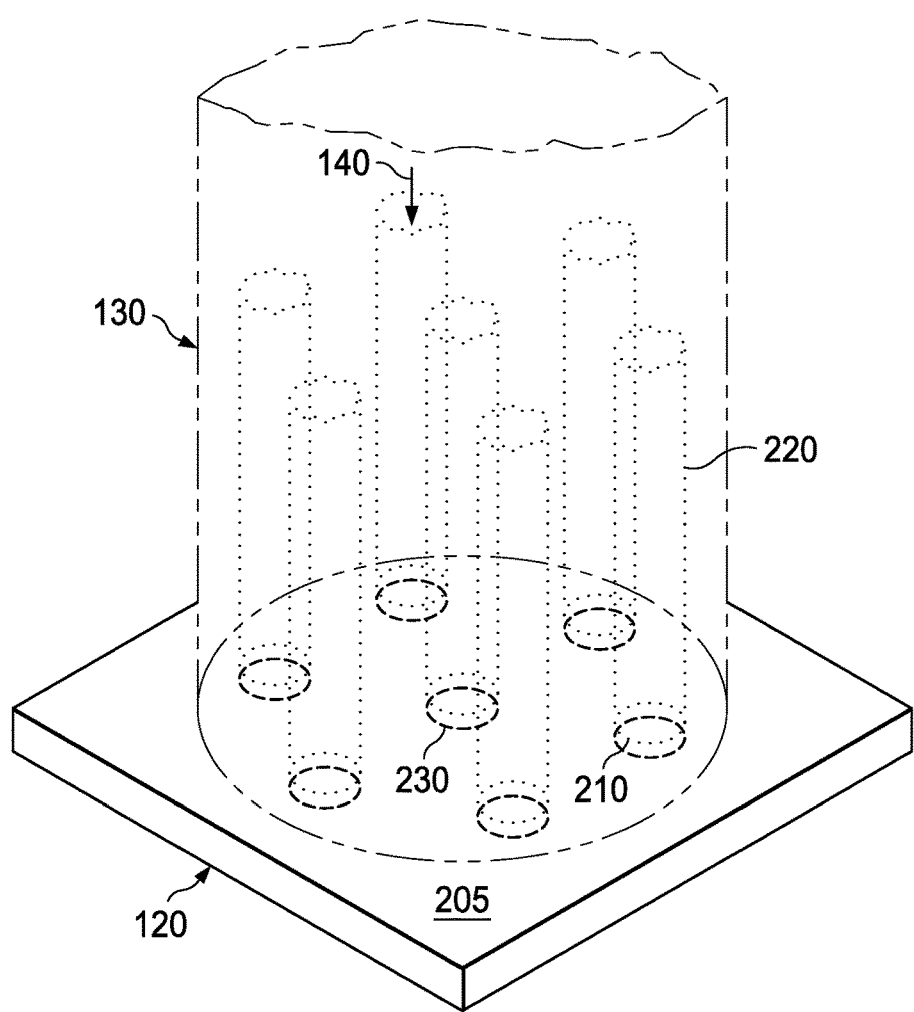
FIG. 2 illustrates the coupling between the multi-core optical fiber and the IPD of FIG. 1, in which the fiber is located such that fiber cores project light signals onto corresponding optical couplers of the integrated photonic device.
Figure 3A:
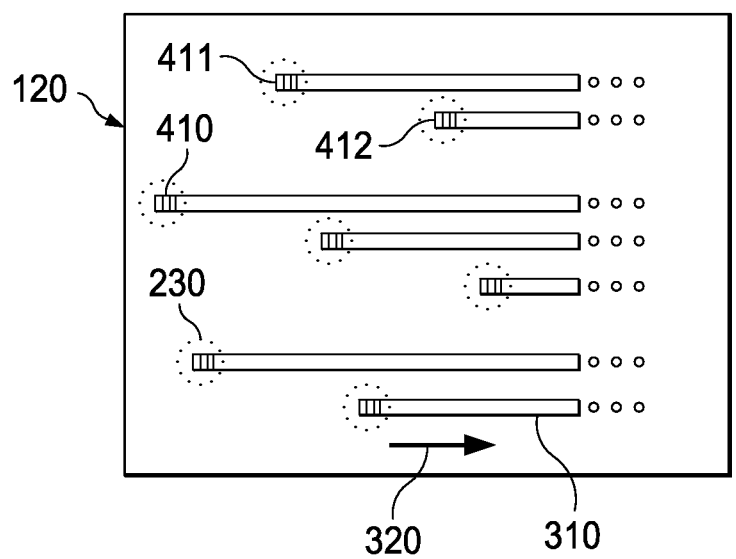
FIGS. 3A-3D illustrate embodiments of planar waveguides of the IPD and optical couplers configured to couple signals from the multi-core optical fiber to the waveguides.
Figure 3B:
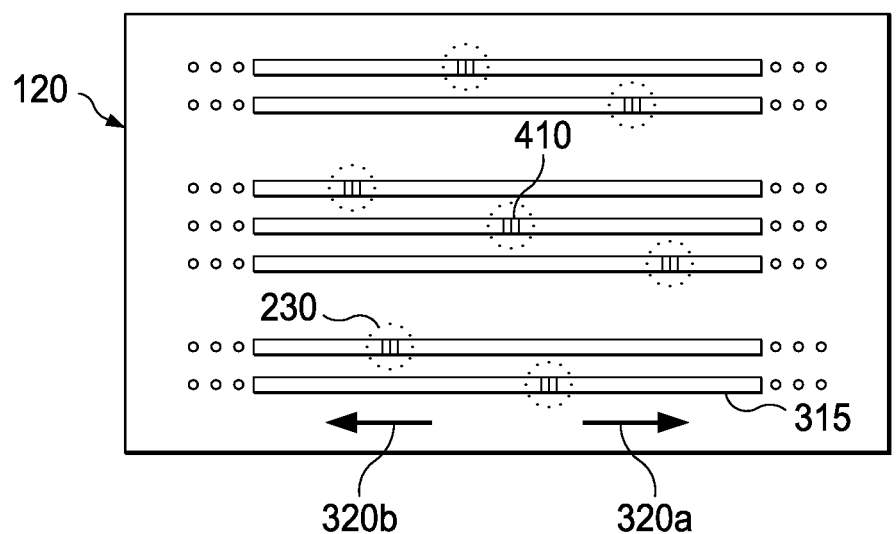
Figure 3C:
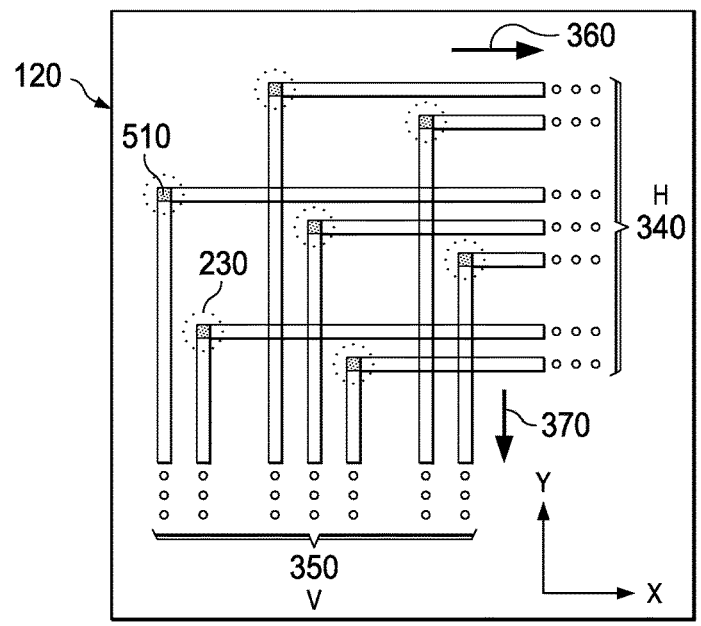
Figure 3D:
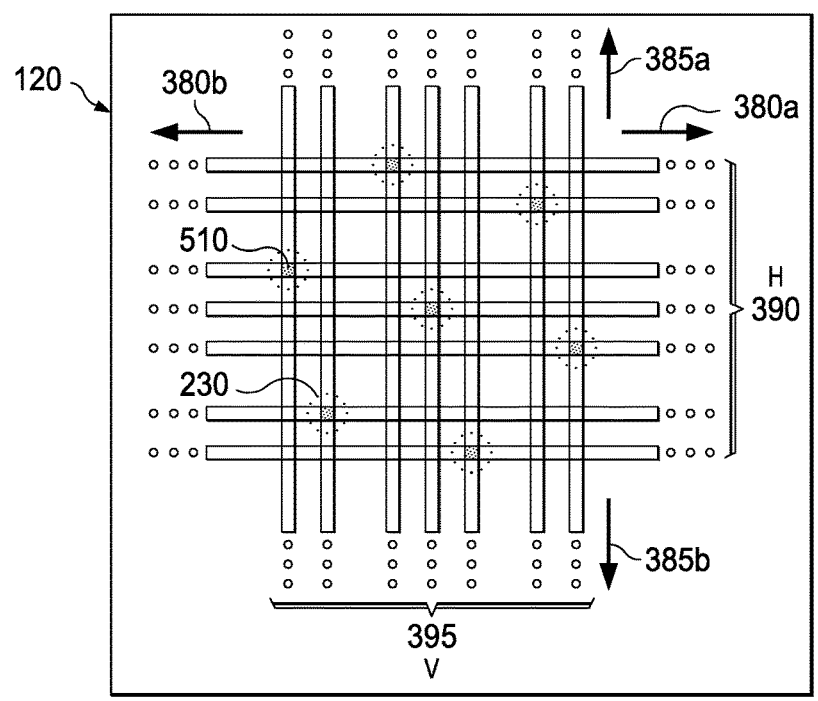
Figure 4A:
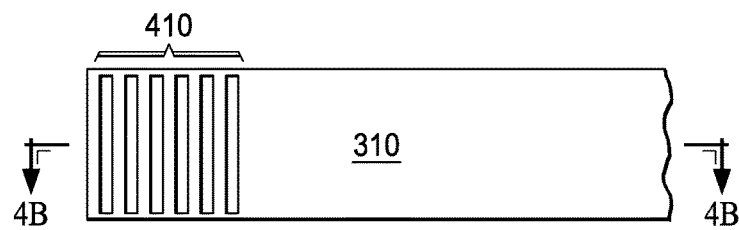
Figure 4B:
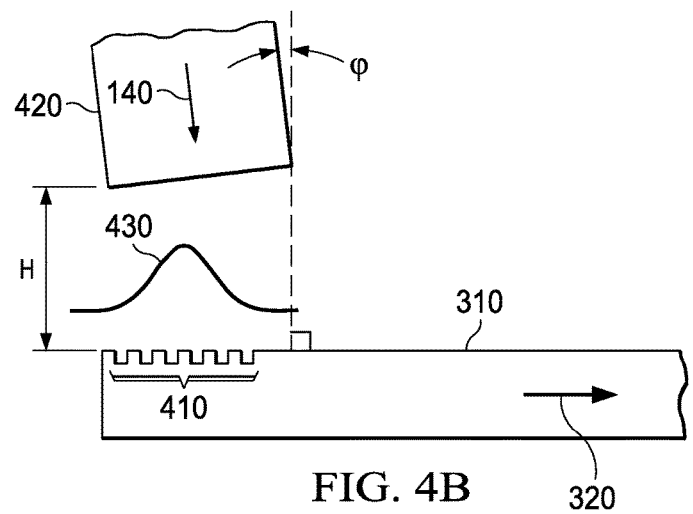
Figure 5A:
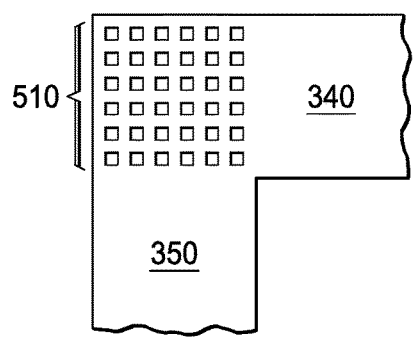
Figure 5B:
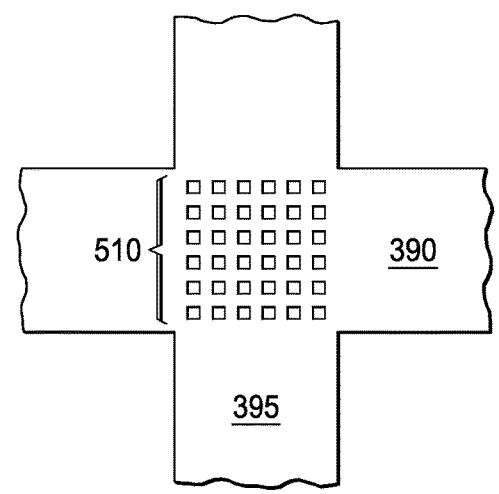
Figure 6:
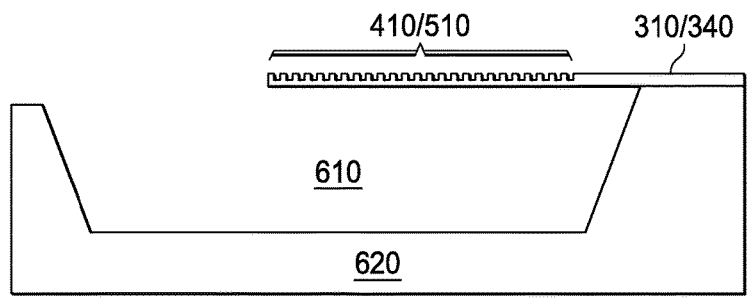
Figure 8:
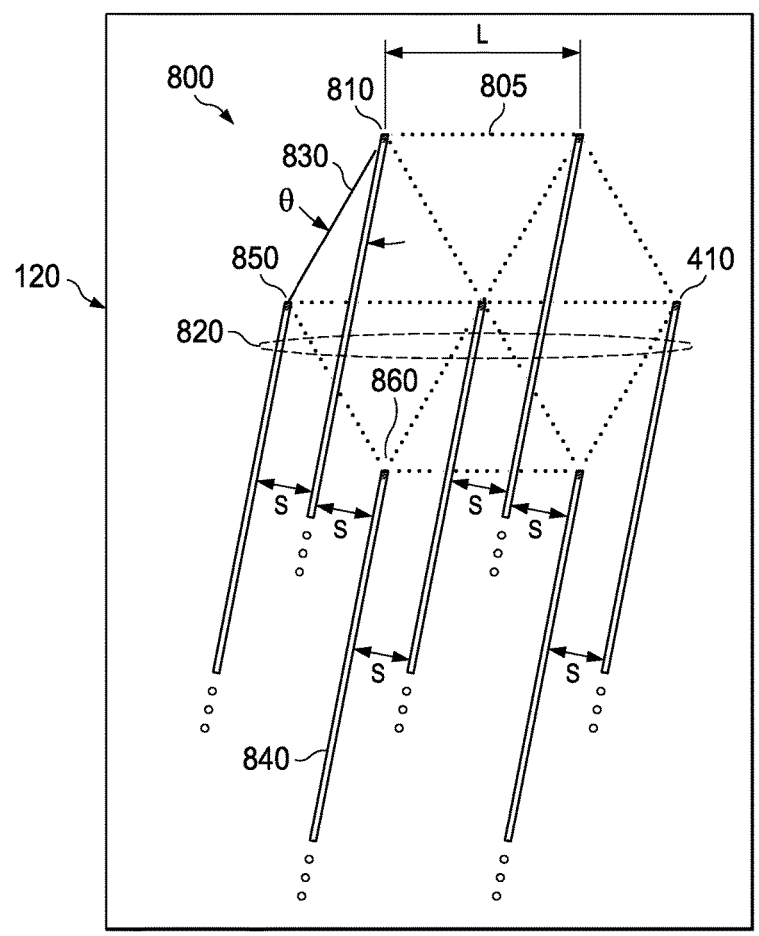
Figure 11:
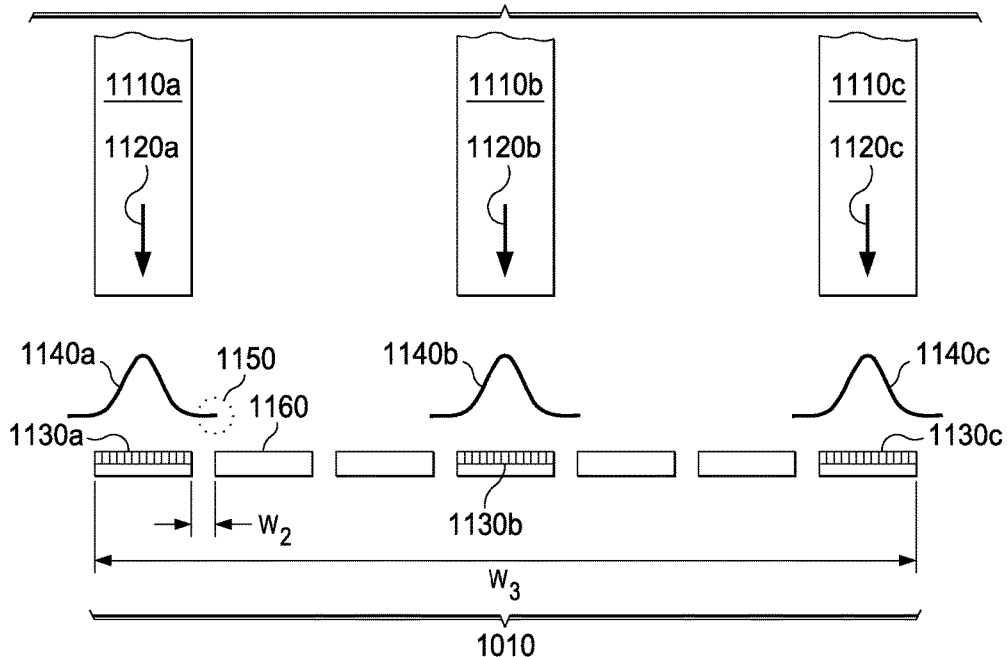
Figure 15:
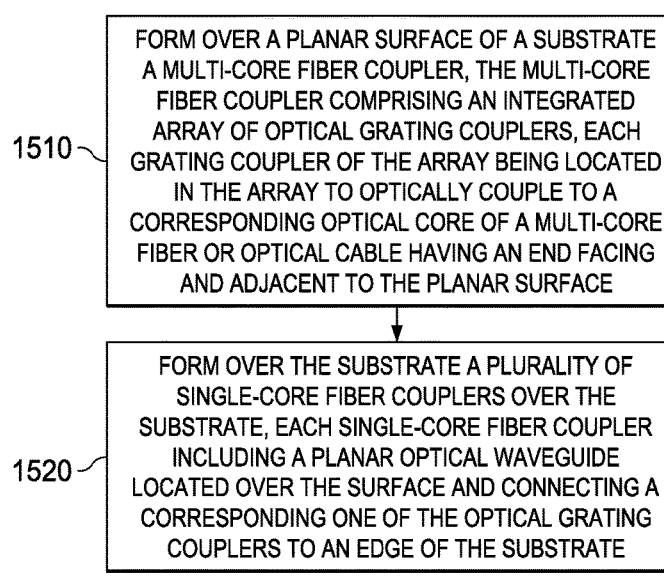
Figure 12:
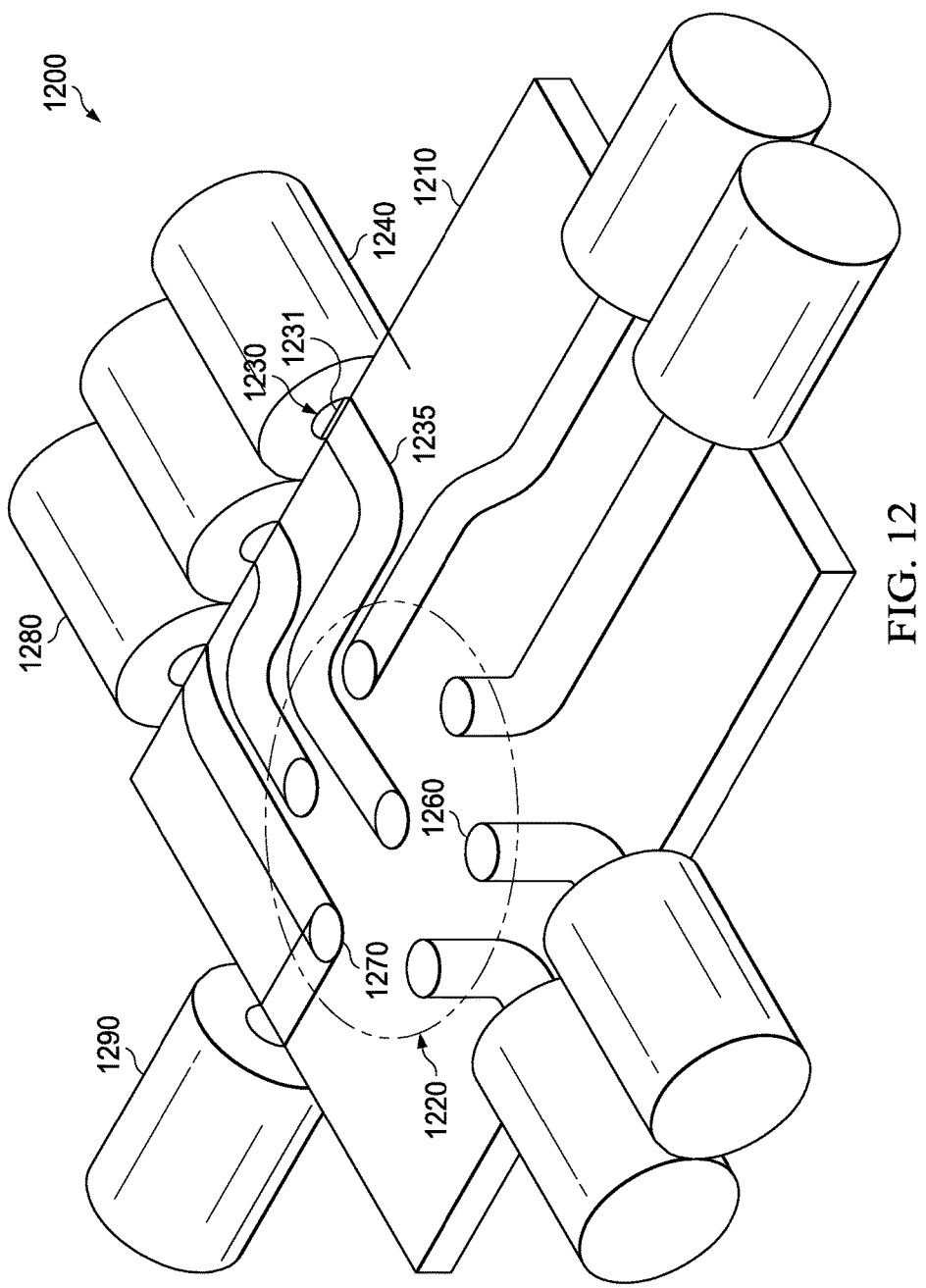
Figure 13A:
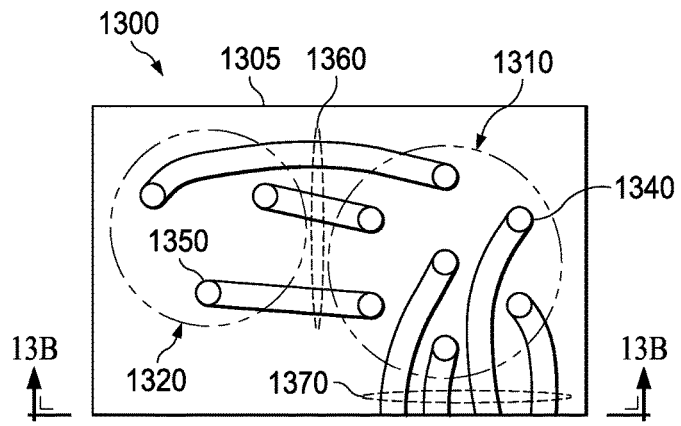
Figure 13B:
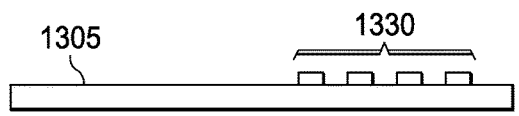
Figure 14:
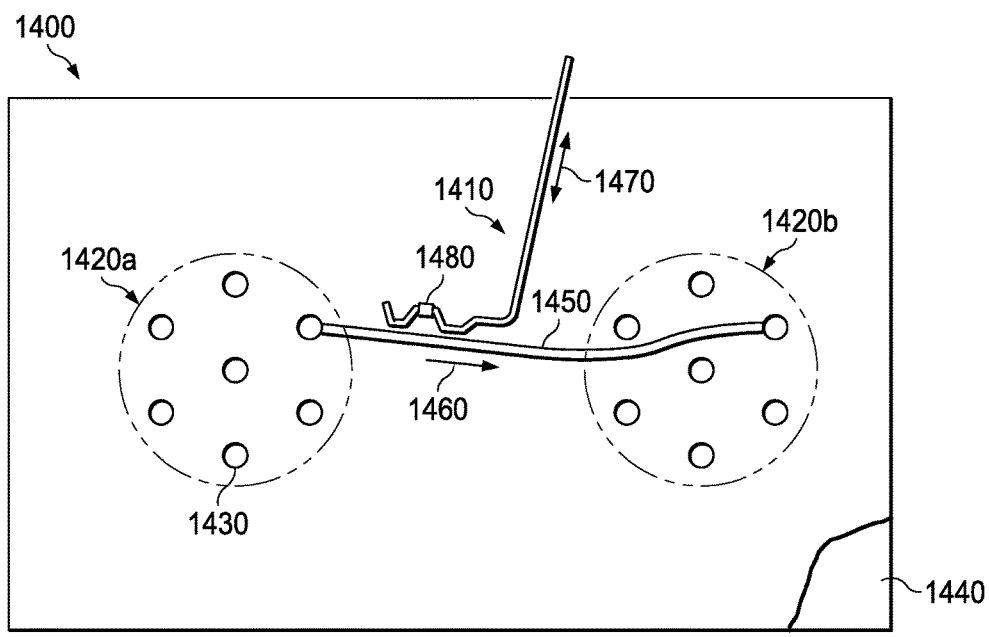

FIGS. 4A and 4B respectively provide a top and side view of a single fiber core and a 1-D pattern grating coupler of the IPD of FIGS. 3A-3D;

FIGS. 5A and 5B illustrate embodiments of a 2-D pattern grating coupler configured to couple an optical signal into X-oriented and Y-oriented waveguides, e.g., as shown in FIGS. 3C-3D;

FIG. 6 illustrates an embodiment of an optical coupler in which a cavity is located between an optical coupler and an underlying substrate, e.g., one of the optical couplers of FIGS. 2, and/or 3A-3D;

FIGS. 7A-7F illustrates various example configurations of the multi-core optical fiber or multi-core optical cable of FIG. 1;

FIGS. 8, 9A and 9B illustrate embodiments of waveguide routings to various example arrays of optical couplers located at vertices of a regular array of triangles;

FIGS. 10 and 11 illustrate relational aspects of an example high density layout of optical couplers and planar waveguides of the IPD of FIG. 1;

FIG. 12 illustrates an embodiment of an integrated fan-out optical coupler for a multi-core fiber (MCF) and a plurality of edge-coupled single-core fibers (SCFs), e.g., for use in the devices of FIGS. 1, 3A, 3B, 3C, 3D, 5A, 5B, 8, 9A, 9B, 10, and/or 13A;

FIGS. 13A and 13B illustrates an embodiment of an integrated monolithic M-core to K-core multi-core fiber fan-out optical coupler;

FIG. 14 illustrates a wavelength add/drop multiplexer that may be used in some embodiments to add a channel to or remove a channel corresponding to one optical core of a MCF; and FIG. 15 illustrates a method of forming a fan-out coupler such as those illustrated in FIGS. 12-14.

DETAILED DESCRIPTION

The increasing integration density of integrated photonic devices (IPDs) places demands on optical connections to the IPD that may not be easily met by conventional connectors. In some cases, an IPD may be no larger than a few millimeters, e.g. 2-5 mm or less, on a side, and may require several optical signals delivered via individual fiber cores. Herein, a "fiber core" may be briefly referred to as a "core" without loss of generality.

Embodiments described herein benefit from the recognition by the inventors that multi-core fibers (MCFs) may be directly face-coupled to an optical device such as an IPD to provide greater data flow to and from the device while using a relatively small portion of the available device area. The face-coupling of the MCF to the device may be provided by one or more planar integrated monolithic arrays of optical couplers.

Herein planar integrated monolithic arrays are formed over a planar optical device substrate. The planar substrate may be any substrate suitable for forming planar optical components thereover, and may include any isolation layers on which the optical components are formed. In one non-limiting example the planar substrate is a semiconductor wafer. A planar substrate is one commonly understood by those skilled in the pertinent art to be planar within customary tolerances for the purpose of semiconductor device and/or integrated photonic device (IPD) fabrication. Optical components may be formed over the planar substrate using conventional material deposition, growth, and/or patterning processes. Such components include, but are not limited to, waveguides, couplers, switches, lasers and photodiodes. The components of the integrated monolithic array are integral to each other, e.g. cannot be separated nondestructively and reassembled. An array of optical couplers is considered to be "planar" when formed approximately on a same geometric plane of an optical device.

Some embodiments herein address the need to communicate with an optical device via multiple optical signal streams, in parallel, by providing methods, devices and systems configured such that the optical device interfaces with a multi-core fiber. Herein and in the claims the term "multi-core fiber", or MCF, includes optical fibers that include at least two separated optical cores embedded in a common cladding. Typically, the optical cores are sufficiently laterally isolated in the common cladding that optical crosstalk therebetween is substantially insignificant. As described herein below, optical couplers on the IPD are laterally located along a surface to match a lateral pattern of fiber cores at the end of a suitably prepared MCF. The MCF may be aligned to an IPD using a single alignment mechanism such that individual cores are aligned with their associated optical couplers. In this manner, a high density optical I/O port or interface may be achieved at low cost, and points of potential failure may be reduced, in some cases.

Turning initially to FIG. 1, illustrated is an optical system 100. The system 100 includes an optical subsystem 110 and an IPD 120. An MCF 130 links the subsystem 110 and the IPD 120. The MCF 130 may provide unidirectional or bidirectional communication between the subsystem 110 and the IPD 120. The subsystem 110 includes a plurality of optical sources, e.g. lasers, and modulation systems configured to modulate the optical sources with data. Such modulation may include, e.g. phase, intensity and/or polarization modulation. The optical subsystem 110 includes an optical signal source that produces a plurality of optical signals 140. The MCF 130 guides the optical signals 140 between the subsystem 110 and the IPD 120. Herein any of the plurality of optical signals 140 may be referred to as an optical signal 140.

The IPD 120 includes one or more separated arrays of optical grating couplers. As described further below, the optical grating couplers are typically arranged in separated two-dimensional (2-D) arrays on a face surface of the IPD 120, e.g., with three or more optical grating couplers in one of the separated arrays. In such an array, one grating coupler is laterally aligned, e.g., with each core of the MCF 130, which has 3 or more cores. In some embodiments the array is configured such that at least two adjacent grating couplers are separated by a very small distance, e.g. about 100 µm or less. In various embodiments the optical grating couplers are arranged in laterally separated arrays, wherein each array has an internal pattern of optical grating couplers that match in form and often also in size to the lateral patterns of the fiber cores of the MCF that is to be end-coupled to the array.

In some embodiments, the MCF 130 of FIGS. 1 and 2 may be replaced by an optical cable including several discrete optical fibers. In such embodiments the optical cable may be prepared, e.g. by cutting at the desired location, and removing any burrs or debris associated with a cable jacket, fillers, etc. If needed the exposed ends of individual optical fibers may be lapped. Hereafter, we may refer to the element 130 of FIG. 2 as being either a MCF or an optical cable.

In other embodiments, the MCF 130 of FIGS. 1 and 2 has a single cladding that forms a physical matrix for multiple core regions therein as already described. In such a multi-core optical fiber, the cores have a higher refractive index than the cladding. Typically, each core region is capable of separately transmitting an optical signal therein with little cross-talk among the multiple core regions. A segment of such a multi-core optical fiber may be isolated from any protective layers, such as a sheath, and cleaved to produce an end for face coupling to an array of optical grating couplers as shown in FIG. 2. If desired, the end of the cladding/core portion may be lapped as well to aid in making such a coupling.

In MCFs herein, the number of fiber cores is not limited to any particular value. However, in the case of multiple-fiber optical cables, commercial cables are readily available that include 72 or more optical fibers. In the case of multiple cores embedded in a single cladding, a seven-core MCF, described in greater detail below, has been manufactured by OFS Labs, Somerset, N.J., USA.

Herein, grating couplers of an array may be arranged in a non-collinear, or 2-D pattern such that a straight line cannot be simultaneously drawn through a same reference location on the grating couplers. Thus, for example, if each grating coupler has a same rectangular perimeter, a straight line cannot be simultaneously drawn through the same corner of the rectangular perimeter of each grating coupler in such an array.

FIG. 2 illustrates an isometric view of the IPD 120 with the end of a MCF 130 or an optical cable located proximate thereto and facing a face surface 205 of the IPD 120. Fiber core ends 210 terminate individual fiber cores 220 within the MCF or optical cable 130. The MCF or optical cable 130 is illustrated without limitation as including six fiber cores 220 arranged in a hexagonal pattern around a seventh central fiber core 220. The optical signal 140 propagating within each fiber core 220 produces a spot 230 on the IPD 120. The MCF 130 typically does not touch the IPD 120, but is located at a distance therefrom such that the beam emerging from each fiber core does not spread excessively. For example, in some embodiments the distance between the core ends 210 and the IPD 120 is in a range from about 100 µm to about 500 µm, inclusive. Due to this arrangement, each fiber core 220 projects a light spot 230 onto a corresponding optical grating coupler of the IPD 120, such as a grating coupler 410 or grating coupler 510, described below. The projection may be done without substantially illuminating other nearby portions of the face IPD 120.

FIGS. 3A-3D illustrate four embodiments of a single array of the IPD 120 that is configured to receive optical signals from the single MCF 130, e.g., as in FIGS. 1 and 2. In FIG. 3A, each spot 230 illuminates a corresponding array of 1-D grating couplers 410 formed on a local region of planar waveguides 310 of the IPD 120. Each planar waveguide 310 may be any conventional waveguide such as a buried or ridge waveguide. Those skilled in the pertinent art are knowledgeable of methods of forming such waveguides. The waveguides 310 may be formed of any material suitable for such purposes, such as silicon, SiN, GaAs, AlGaInAs and LiNbO3. Each of the waveguides 310 includes an instance of a grating coupler 410 described below, i.e., for optically coupling to one of the cores of an MCF or optical cable.

FIGS. 4A and 4B respectively illustrate top and side views of a single optical grating coupler 410 and a waveguide 310 coupled thereto. An individual fiber core 420 (FIG. 4B) is one of a plurality of similar cores within the MCF or optical cable 130. The core 420 guides the optical signal 140 to the grating coupler 410. The intensity cross section of the projected optical signal 140 is expected to closely approximate a Gaussian distribution 430. The grating coupler 410 is a linear (1-D) array of trenches and ridges formed into the associated waveguide 310. The combined width of one trench and one ridge (e.g. the grating pitch) is typically chosen to be about equal to one wavelength of the transverse electric (TE) mode in the waveguide 310 so that the scattered portions from each period of the grating add constructively in the waveguide. This typically provides effective coupling of the TE propagation mode of the waveguide 310 to the fiber mode that has its electrical field about parallel to the grooves. In some embodiments the grating pitch is about equal to one wavelength of the transverse magnetic (TM) mode in the waveguide 310. This typically provides effective coupling of the TM propagation mode of the waveguide 310 to the fiber mode that has its electrical field about perpendicular to the grooves. Light received by the grating coupler 410 is scattered and coupled to a horizontal optical signal 320 that propagates parallel to the planar waveguide 310. Once coupled to the waveguide 310 the optical signal 320 is usually TE polarized.

FIG. 4B illustrates the general case in which the core 420 forms an angle φ with respect to a surface normal of the waveguide 310. In some embodiments φ is nonzero as illustrated. In such cases, coupling of the optical signal 140 to the waveguide 310 favors the formation of the signal 320 in a unidirectional fashion. In other embodiments φ is preferably about zero, e.g. normal to the waveguide 310. Such an embodiment is discussed further below.

Referring concurrently to FIGS. 2 and 4B, the adjacent end of the MCF or optical cable 130 may be held in position relative to the IPD 120 by mechanical techniques that may be determined by one skilled in the pertinent art without undue experimentation. Such techniques may include a V-groove assembly and a positioning mechanism that permits three-axis translation and rotation of the MCF 130 such that the core ends 210 may be positioned with respect to height H and lateral position above the adjacent face of the IPD 120, and aligned with, e.g. the grating couplers 410 on the face.

Returning to FIG. 3A, the previously described example of seven fiber cores 220 within the MCF or optical cable 130 is continued. Each fiber core 220 projects a corresponding spot 230 onto a corresponding optical grating coupler 410. Each spot 230 is illustrated as having an area larger than the corresponding optical grating coupler 410, but may have an area comparable to or smaller than the corresponding optical grating coupler 410. The optical grating couplers 410 are advantageously placed at locations corresponding to the locations of the core ends 210 to receive the optical signal 140 within the corresponding fiber core 220. It may be preferred to locate the optical grating couplers 410 such that a peak of the corresponding Gaussian distribution 430 falls at about a geometric center of the corresponding optical grating coupler 410. The optical grating coupler 410 may simultaneously act as a fiber coupler and an integrated spot-size converter. The received optical signals, e.g. the signal 320, propagate in the direction of the planar waveguides 310.

Because the MCF or optical cable 130 end is brought directly to the IPD 120 surface, the optical grating couplers 410 of a single coupling array may be laterally very close. In some embodiments, e.g. one optical grating coupler, e.g. an optical grating coupler 411, is located about 100 µm or less from an adjacent (e.g. nearest neighbor) optical grating coupler, e.g. the optical grating coupler 412. In some cases the separation of adjacent optical grating couplers is about 50 µm or less. In some embodiments, as described further below, the separation of adjacent optical grating couplers is about 38 µm. Some of the arrays herein for face-coupling to an IPD can pass barriers on the density of I/O interfaces with an IPD by positioning optical couplers for adjacent optical fiber cores at separation distances of 100 µm or less.

FIG. 3B illustrates an embodiment in which waveguides 315 extend in two opposite directions from the optical grating couplers 410. It may be preferable in such cases that the core 220 be positioned about normal to the waveguide 315, e.g. φ≈0. In this case the optical signal 140 may be split, in some cases, evenly between oppositely directed components. Thus, a right hand signal 320a and a left hand signal 320b coupled to the waveguide 315 may have about equal intensity, e.g., for certain polarizations. The signals 320a, 320b may be recombined if desired or processed separately on the IPD 120.

FIG. 3C illustrates an embodiment of the IPD 120 in which 2-D pattern grating couplers 510, described below, are configured to separate the incoming optical signal 140 of FIG. 2 into an "X" component and a "Y" component, as referenced by an illustrative coordinate axis. The optical signal 140 may be arbitrarily polarized with respect to horizontal waveguides 340 and vertical waveguides 350. X components 360 are directed to the horizontal waveguides 340 while Y components 370 are directed to vertical waveguides 350. The waveguides 340, 350 are unidirectional, in that they respectively extend only in one direction along the illustrated coordinate x and y axes.

FIG. 3D illustrates a similar embodiment in which the grating couplers 510 respectively direct X components 380a, 380b and Y components 385a, 385b to bidirectional horizontal waveguides 390 and bidirectional vertical waveguides 395.

FIG. 5A illustrates the 2-D pattern grating coupler 510 for the case of FIG. 3C, e.g. in which the X and Y components of the received signal propagate unidirectionally from the grating coupler 510. The grating coupler 510 illustratively includes a regular 2-D array of pits formed at the intersection of the planar waveguides 340, 350. The article by Christopher R. Doerr, et al., "Monolithic Polarization and Phase Diversity Coherent Receiver in Silicon", Journal of Lightwave Technology, Jul. 31, 2009, pp. 520-525, which is incorporated herein by reference in its entirety, may describe examples of such arrays. With respect to arrays, "regular" means each element of the array is spaced about a same distance from nearest neighbor element(s) thereof. The grating coupler 510 may separate X and Y components of the optical signal 140 and direct one component, e.g. X, in the direction of the waveguide 340 and another component, e.g. Y, in the direction of the waveguide 350.

In FIG. 5B the grating coupler 510 is located at an intersection of the waveguide 390 and the waveguide 395. Light from the X component of the optical signal 140 may be coupled bidirectionally into the waveguide 390. Referring back to FIG. 3D, e.g. a first component 380a may be directed to the right with respect to the figure, and a second component 380b may be directed to the left. Similarly, light from the Y component of the signal optical 140 may be coupled bidirectionally in the waveguide 395. Again referring back to FIG. 3D, a first component 385a may be directed upward and a second component 385b may be directed downward as FIG. 3D is oriented.

FIG. 6 illustrates an embodiment in which a cavity 610 is located between the grating coupler 410 or grating coupler 510 and an underlying substrate 620. An example of a method of forming a suitable form of the cavity 610 may be disclosed in U.S. patent application Ser. No. 12/756,166 incorporated herein by reference in its entirety. One method for forming the cavity 610 involves performing a conventional wet chemical etch process to remove a portion of the substrate 620 on which the waveguide, e.g. the waveguide 310 or the waveguide 340, has been formed. The presence of the cavity 610 reduces the refractive index below the grating coupler 410 relative to the case in which the cavity is not present. In some circumstances the lower refractive index increases coupling efficiency between an optical signal projected onto the grating coupler 410 and the waveguide 310, or increases the efficiency for coupling a signal from the waveguide 310 to the grating coupler 410.

Figure 7A:
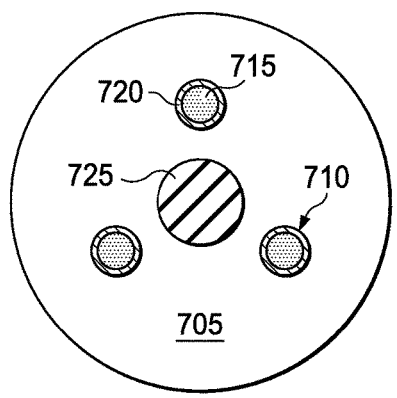
Figure 7B:
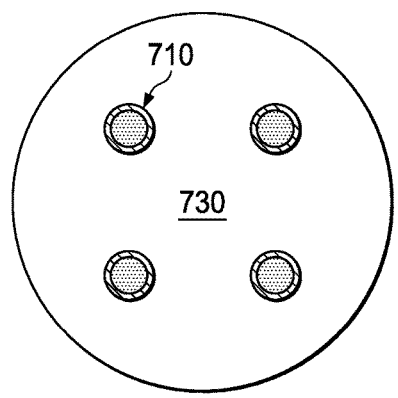
Figure 7C:
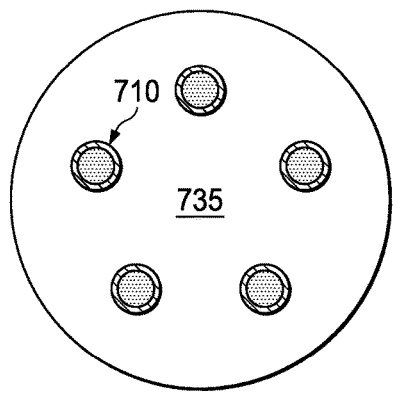
Figure 7D:
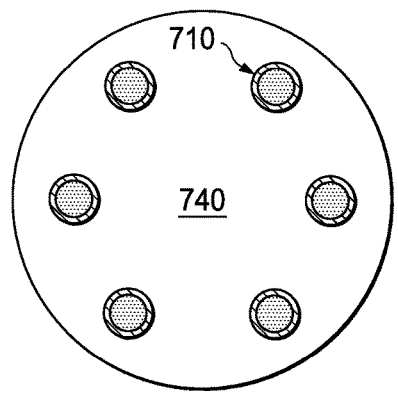
Figure 7E:
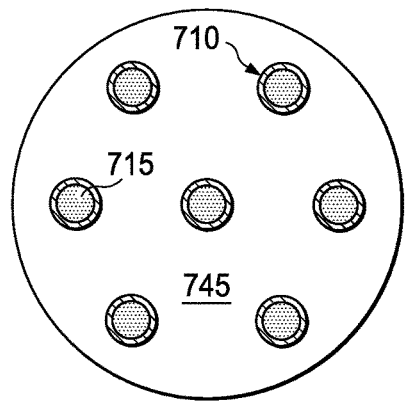

FIGS. 7A-7F illustrate six example configurations of fiber cores in a multi-core configuration, i.e., of a MCF or an optical cable. FIG. 7A illustrates a multi-core optical cable (MCOC) 705 that includes three individual optical fibers 710. The MCOC 705 is, e.g. a multi-fiber device. Each optical fiber 710 includes a core 715 and a cladding 720. The optical fibers 710 are arranged around a strain relief 725 that is illustrative of nonoptical components that may be present within the MCOC 705, including packing or filler materials. FIGS. 7B-7E respectively illustrate MCFs 730, 735, 740, 745 respectively having four, five, six and seven optical fibers 710. The number of fibers within an MCF is not limited to any particular number.

In each of the MCFs 705, 730, 735, 740, 745 the fiber cores 715 are arranged in a lateral 2-D pattern, e.g. a straight line cannot be drawn through each of the cores 715. For coupling to the MCFs 705, 730, 735, 740, 745, the corresponding optical grating couplers 410, 510 of the arrays of FIGS. 3A-3D, 4A-4B, and 5A-5B would be laterally arranged in patterns to match the lateral locations of the fiber cores 715, i.e., the grating couplers would also be arranged in such 2-D patterns. The minimum distance between the fiber cores 715 will depend in part on the thickness of the cladding 720 and the presence and form of any sheath or other components between the optical fibers 710, i.e., in optical cables. In each case an embodiment of the IPD 120 may be configured to have the optical grating couplers 410 or optical grating couplers 510 arranged thereon in a lateral pattern that corresponds to the lateral pattern of optical fibers 710, or more specifically the fiber cores 715, within the corresponding multi-core cable.

Figure 7F:
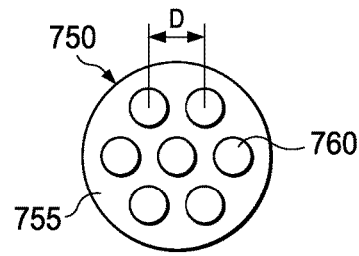

FIG. 7F illustrates an embodiment in which an MCF 750 is a multi-core fiber. As understood by those skilled in a pertinent art, a multi-core fiber is a fiber having a cladding region that is a common matrix to a plurality of core regions. But, the cladding region may, in some embodiments also have voids therein. Because the core regions of an MCF do not each have a separate cladding or sheath, the core regions may be spaced more closely than separate cores may be placed in a single optical cable. For example, the MCF 750 includes a cladding region 755 and core regions 760. The illustrated embodiment includes seven core regions, but embodiments are not limited to any particular number of core regions 760. A distance D is the distance from the center of one core region 760 to the center of an adjacent core region 760. While D is not limited to any particular value, in some embodiments D is preferably about 100 µm or less and more preferably about 50 µm or less. For example, the OFS Labs multi-core fiber previously described is reported to have a center-to-center spacing of about 38 µm between nearest neighbor fiber cores. In the illustrated configuration the centers of the core regions 760 are located at the vertices of a regular array of triangles, e.g. equilateral triangles. The seven core regions 760 are located such that the core ends 210 are located at the center and vertices of a regular hexagon, e.g. a hexagon for which the sides have about equal length and the vertices have about a same angle.

FIG. 8 illustrates an embodiment 800 of the IPD 120 configured to couple to seven fiber cores, such as the fiber cores 760, located at vertices of an equilateral triangular lattice 805 with sides having length L. The lattice is indicated by dashed lines between vertices for reference. Grating couplers 810 are located at the vertices. The center-center distance (also L) between the grating couplers 810 may be the distance between fiber cores, such as for the cores 715 or the cores 760. In some embodiments L may be about 50 µm or less, and may be about 38 µm. Thus, in one embodiment the MCF 750 may be brought close, e.g. 100 µm to 500 µm, to the array of grating couplers 810 to simultaneously project signals carried by the core regions 760 within the MCF 750 onto each of the seven grating couplers 810.

In an embodiment the planar waveguides 820 are configured so that they are parallel and equally spaced, e.g. by a distance S. The waveguides 820 form an angle θ with respect to a line 830 drawn between a first grating coupler 810, and a next-nearest grating coupler 850 as illustrated. The angle θ may be determined to be equal to about $$\frac{\pi}{3} - \tan^{-1}\frac{\sqrt{3}}{2},$$

or about 19°. In some cases it is preferred that θ is 19°±2°, with 19°±1° being preferred. When arranged in this manner the waveguides 820 are about equally spaced from the grating couplers 810. For example, a waveguide 840 is equidistant from the grating coupler 850 and a grating coupler 860 at the points of closest approach. Thus the interaction of each projected spot, e.g. the spots 230, with adjacent waveguides 820 will be minimized and about equal. The illustrated arrangement advantageously provides a compact and regular configuration of the waveguides 820 and the grating coupler 810.

In some embodiments, an MCF or optical cable such as the MCF 130 may be tilted with respect to the adjacent face surface of the IPD 120 to favor unidirectional coupling into the waveguides 820. One such embodiment is illustrated in FIG. 4B, for example. In particular such coupling of a particular fiber core within the MCF is advantageously favored when that fiber core is tilted in a plane perpendicular to the IPD 120 surface and parallel to an associated waveguide 820. When the MCF is tilted the resulting light spot projected onto the IPD 120 is stretched into an ellipse. Referring to FIG. 4B, the major axis of the ellipse is stretched by about a factor of about 1/cos(φ). In various embodiments the optical grating coupler, e.g. an optical grating coupler 410, 510, may be elongated in the direction of the major axis of the projected ellipse to capture light that might otherwise fall outside the extent of the grating coupler. The elongation of the optical grating coupler may also be by about a factor of about 1/cos(φ).

While the embodiment 800 provides a particularly compact arrangement of optical grating couplers 810, other embodiments having more relaxed dimensions are possible and contemplated. For example, referring back to FIG. 7E, the MCF 745 has seven optical fibers 710 arranged in hexagonal pattern similar to that of the MCF 750. However, the minimum distance between the fiber cores 715 in the MCF 745 is significantly greater than that of the MCF 750. Thus, while an array of the grating couplers 410 may be arranged to correspond to the pattern of fiber cores 715 in the MCF 745, the arrangement will not be as compact as the array that corresponds to the core regions 760 of the MCF 750.

The compactness of the embodiment 800 provides a means to provide a high-density optical I/O port at a face of the IPD 120. The length L may be reduced to the limit supported by the minimum width and spacing of the waveguides 310 and the minimum spacing between the centers of the fiber cores 715 or core regions 760. In the illustrated MCF coupler 800 seven fiber cores, such as the fiber cores 715 or core regions 760, form a hexagonal pattern having six equilateral triangles. Fewer or more fiber cores 420 and waveguides 310 may be used as well. Moreover, in some embodiments the pattern may be distorted in the vertical or horizontal directions of FIG. 8 to form an array of isosceles triangles and still produce at least some of the benefit of the equally-spaced waveguides 820. It is specifically noted, however, that while a triangular or hexagonal pattern of fiber cores 420 and optical grating couplers 410, 510 is advantageous in some cases, the disclosure is not limited to any particular 2-D pattern arrangements of the fiber cores 420 or the optical grating couplers 410, 510.

FIGS. 9A and 9B illustrate two alternate embodiments of compact optical I/O ports illustrated in schematic form to highlight the geometric arrangements of elements. In FIG. 9A, an optical I/O port 910 includes 13 optical grating couplers, e.g. the optical grating couplers 410 at vertices of the illustrated triangles. Thirteen equally spaced waveguides 920 carry received optical signals from the optical grating couplers 410. In another example illustrated by FIG. 9B, an optical I/O port 930 includes four optical grating couplers 410 at vertices of the illustrated triangles and four corresponding equally spaced waveguides 940.

FIG. 10 illustrates an optical I/O port 1000 drawn to approximate relative scale. Seven bidirectional waveguides 1010 receive seven corresponding optical signals via seven optical grating couplers 1020. A hexagon 1030 is provided for reference. The hexagon 1030 is rotated with respect to the vertical direction of the figure such that the waveguides 1010 are vertical. The waveguides 1010 have a width $W_1$ that is related to the wavelength of the optical carrier of the received signals. For example, when the carrier wavelength is about 1.5 µm, $W_1$ may be about 10 µm. Each waveguide 1010 is separated from its neighbor by a space $W_2$. The minimum value of $W_2$ may be related to a minimum dictated by processing limitations, or to ensure that no more than small cross-over of a signal occurs from one waveguide 1010 to a neighboring waveguide 1010. An aspect of cross-over that may be significant in some cases is the extent to which the light beam that emerges from the fiber ends diverges.

This latter point is illustrated by FIG. 11, which is a section taken through the I/O port 1000. Optical fibers 1110a, 1110b, 1110c guide optical signals 1120a, 1120b, 1120c to corresponding optical grating couplers 1130a, 1130b, 1130c. The intensity of the spot formed by each optical signal 1120a, 1120b, 1120c may be approximated by Gaussian distributions 1140a, 1140b, 1140c. Focusing on the Gaussian 1140a, the light may spread after the optical signal 1120a emerges from the fiber 1110a such that a tail portion 1150 overlaps a neighboring waveguide 1160. The overlapping tail portion 1150 may couple some light from the optical signal 1120a to the waveguide 1160, thereby increasing noise on a data channel carried by the waveguide 1160. The spacing $W_2$ between the waveguides 1010 may be limited by a minimum value such that such noise remains below a maximum allowable value.

Returning to FIG. 10, in one nonlimiting example the length L is about 38 µm and the space $W_2$ is about 2.5 µm. Thus a total width $W_3$ of the I/O port 1000 in this case is about 85 µm. In marked contrast, conventionally coupling seven fiber cores using a conventional linear array of V-grooves with a pitch of 127 um would require a total width of about 762 um. Thus I/O port 1000 uses only about one tenth the linear extent of the conventional implementation. The I/O port 1000 will therefore, among other advantages, cause significantly less interference with layout of optical components, such as waveguides and couplers, on the IPD 120.

FIG. 12 illustrates an embodiment of a planar optical device 1200, e.g. an integrated monolithic MCF interface, that may be used to interface between an MCF or optical cable, e.g., the MCF or optical cable 130 of FIG. 2, and one or more single-core fibers (SCFs). The device 1200 includes a substrate 1210, e.g. a planar optical device substrate, with an MCF coupler 1220 and one or more instances of an SCF coupler 1230 formed thereover. Each SCF coupler 1230 includes a planar waveguide, exemplified by a waveguide 1235, that is located over the substrate 1210 and optically connects directly to a corresponding one of the optical grating couplers of the MCF coupler 1220. The SCF coupler 1230 may include an edge facet 1231 of the waveguide 1235. The planar waveguide 1235 has an end that is located at or near an edge of the planar optical device 1200 and that forms the optical I/O interface for an adjacent end of a SCF. The planar waveguide 1235 may be, e.g. a buried or a ridge waveguide. Each SCF coupler 1230 is configured to couple an optical signal to or from the core of a corresponding SCF, exemplified by an SCF 1240, via an edge of the IPD 120.

The MCF coupler 1220 includes an integrated monolithic array of optical grating couplers 1260. The illustrated array includes seven optical grating couplers 1260, though different embodiments may have different numbers of such optical grating couplers and different numbers of SCF couplers. While the illustrated embodiment the planar optical device 1200 includes a waveguide 1235 for each of the optical grating couplers 1260, the scope of the disclosure also includes embodiments in which one or more of the optical grating couplers 1260 are not associated with a corresponding waveguide 1235 for a SCF coupler.

Each optical grating coupler 1260 may be a 1-D pattern grating coupler such as the grating coupler 410 or a 2-D pattern grating coupler such as the grating coupler 510. A 2-D pattern grating coupler 1270 illustratively couples a first polarization mode, such as TE, to or from an SCF 1280. The grating coupler 1270 illustratively couples a second polarization mode, such as TM, to or from an SCF 1290. In some such embodiments, each optical grating coupler 1260 of an array may be on two optical waveguides for SCF couplers, e.g., so that separate SCF couplers 1230 receive light of the two orthogonal polarization components of the optical core of the MCF or optical cable connected thereto.

FIGS. 13A and 13B illustrate an embodiment of an optical device 1300, e.g. an MCF interface, that includes a planar optical device substrate 1305 with two laterally separated and disjoint MCF couplers 1310, 1320, i.e., two laterally separated and disjoint arrays of optical grating couplers, and SCF couplers 1330, e.g. edge facet couplers. The MCF coupler 1310 includes an integrated monolithic array of M optical grating couplers 1340, where M equals, e.g. seven. The MCF coupler 1320 includes K an integrated monolithic array of optical grating couplers 1350, where K equals, e.g. three. Each of the optical grating couplers 1340, 1350 may include, e.g. the 1-D pattern grating coupler 410 or the 2-D pattern grating coupler 510. The optical grating couplers 1350 may be configured, e.g. to couple signals to a MCF having three cores as illustrated. Waveguides 1360 couple each of K, e.g. three, of the optical grating couplers 1340 to a corresponding one of optical grating couplers 1350. Waveguides 1370 for SCF couplers that couple each of the remaining M-K, e.g. four, optical grating couplers 1340 to a corresponding one of the SCF couplers 1330.

FIG. 14 illustrates an embodiment of a device 1400, e.g. an MCF coupler, that includes one or more instances of a wavelength add/drop multiplexer 1410. The device 1400 includes a number of laterally separated and disjoint instances, e.g. two such instances are illustrated, of an integrated monolithic array 1420 of optical grating couplers 1430 located over a face surface of a planar substrate 1440, e.g. a portion of a planar silicon wafer. For notational convenience the two arrays are designated arrays 1420a and 1420b, respectively. The optical grating couplers 1430 may be, e.g. 1-D pattern grating couplers such as the grating coupler 410 of FIG. 4A-4B or 6 or 2-D pattern grating couplers such as the grating coupler 510 of FIG. 5A-5B or 6.

One or more planar waveguides 1450 integrated over the substrate 1440 connect(s) a single one of the optical grating couplers 1430 of the array 1420a to a corresponding single one of the optical grating couplers 1430 of the array 1420b. In some embodiments, not pictured, a waveguide 1450 connects to more than one of the optical grating couplers 1430 of one or both of the arrays 1420a, 1420b. MCFs, such as the MCF 130, may be optically end-coupled to each of the arrays 1420a, 1420b. Optical signals, exemplified by an optical signal 1460, may thereby be received from an input MCF (not shown) and propagate through the waveguide 1450 to an output MCF (not shown). Coupling may be configured to be unidirectional on the waveguide 1460. For example, in some embodiments, the wavelength add/drop multiplexer may be constructed to add a signal that substantially only propagates as shown by the arrow depicting the optical signal 1460 in the waveguide 1450 rather than propagating in the reverse direction as indicated by the arrow therein.

The wavelength add/drop multiplexer 1410 includes a waveguide that has a segment located adjacent one of the waveguides 1450 connecting between optical grating couplers of the two arrays 1420a, 1420b. In particular, this segment enables the wavelength add/drop multiplexer 1410 to add and/or drop one or more wavelength channels via an add/drop signal 1470 from a corresponding optical core of the MCF(s) end-coupling to the arrays 1420a, 1420b. A controllable heater 1480 or other device may provide a structure to control the optical coupling between the adjacent segment of the wavelength add/drop multiplexer 1410 and the waveguide 1450. By appropriate control of the heater 1480 to change the optical coupling, the add/drop signal 1470 may be caused to replace a signal propagating within the waveguide 1450.

For example, the optical signal 1460 may be a wavelength division multiplexed (WDM) signal initially bearing two or more data channels at corresponding wavelengths, e.g. $\lambda_1$ and $\lambda_2$. The $\lambda_2$ channel may be transferred, under control by the heater 1480, to the add/drop signal 1470 such that the optical signal 1460 does not include significant energy at $\lambda_2$. In another example, the add/drop signal 1470 may include a signal component at $\lambda_3$ which, under control by the heater 1480, may be transferred to the waveguide 1450 such that the optical signal 1460 includes $\lambda_1$, $\lambda_2$ and $\lambda_3$. In either case, under the control of the heater 1480, a signal on a selected wavelength channel is moved between the waveguide 1450 connecting the arrays 1420a, 1420b and the segment of the waveguide of the wavelength add/drop multiplexer 1410.

Turning to FIG. 15, a method 1500 is presented of manufacturing an optical device, e.g. the devices 1200, 1300, 1400 of FIGS. 12, 13a, 13b, and 14. The method 1500 is described without limitation with reference to the device 1200 and/or the device 1300 and/or the device 1400 as appropriate. The steps of the method 1500 may be performed in another order than the order shown.

In a step 1510 a multi-core fiber coupler, e.g. the MCF coupler 1220, is formed over a planar surface of a substrate, e.g. the substrate 1210. The multi-core fiber coupler includes an integrated array of optical grating couplers, e.g. the optical grating couplers 1260. Each grating coupler of the array is located in the array to optically couple to a corresponding optical core of a multi-core fiber, e.g. the MCF 750, or optical cable, e.g. the MCF 750, having an end facing and adjacent to the planar surface.

In a step 1520 a plurality of single-core fiber couplers, e.g. instances of the SCF coupler 1230, are formed over the substrate. Each single-core fiber coupler includes a planar optical waveguide, e.g. the waveguide 1235, located over the surface. The planar optical waveguide connects a corresponding one of the optical grating couplers to an edge of the substrate.

The following provides various optional embodiments of the method 1500. In some cases these optional embodiments may be performed, if at all, separately or in combination with other of the optional embodiments.

Each of the single-core fiber couplers may include an edge facet, e.g. the edge facet 1231, of one of the planar waveguides. The optical couplers of the array may be arranged in a regular hexagonal pattern, such as the hexagon 1030.

The array may be a first array, such as the MCF couplers 1310, with the method 1500 further including forming a laterally separated and disjoint second array of optical grating couplers, such as the MCF couplers 1320, over the surface. In some such embodiments some of the optical grating couplers of the second array may be optically coupled to corresponding optical grating couplers of the first array in a one-to-one manner by planar optical waveguides, such as one of the waveguides 1360.

Each of the optical couplers may be separated from an adjacent one of the optical grating couplers by about 100 µm or less. The optical couplers may be 1-D pattern gratings, such as the grating coupler 410. At least one of the optical couplers may be configured, as exemplified by the grating coupler 510 in FIG. 3C, to separate an optical signal received from a multi-core optical fiber or optical cable into a first polarization component and a relatively orthogonal second polarization component.

A multi-core optical cable may be configured to optically couple each of a plurality of optical cores thereof to a corresponding one of the optical grating couplers. In some such embodiments an optical source such as provided by the optical subsystem 110, may be configured to transmit one of a plurality of optical signals via each of the optical cores.

Each of a plurality of single-mode fibers may be configured to optically couple to a corresponding one of the single-core optical couplers via an edge of the substrate, as illustrated, e.g. by FIG. 12.

Those skilled in the art to which this application relates will appreciate that other and further additions, deletions, substitutions and modifications may be made to the described embodiments.

What is claimed is:

1. An optical device, comprising:
    a planar substrate;
    a first array of optical grating couplers located over a surface of said planar substrate, the optical grating couplers of said array being located to optically couple in a one-to-one manner to optical cores of a multi-core fiber or optical cable having an end located adjacent to said surface;
    a second array of optical grating couplers over said surface, the second array being disjoint from the first array and laterally separated from the first array, wherein a plurality of the optical grating couplers of said second array are optically coupled to corresponding ones of the optical couplers of said first array in a one-to-one manner by planar optical waveguides on said surface; and
    a plurality of single-core fiber couplers located over said substrate, each single-core fiber coupler including a planar optical waveguide connecting a corresponding one of said optical couplers of said first array, to an edge of the substrate.

2. The optical device as recited in claim 1, wherein said single-core fiber couplers include an edge facet of a planar waveguide.

3. The optical device as recited in claim 1, wherein said optical grating couplers of said array are arranged in a regular hexagonal pattern.

4. The optical device as recited in claim 1, further comprising
    a wavelength add/drop multiplexer on said substrate and optically coupled to one of said planar optical waveguides that couple one of the optical couplers of said second array to the corresponding one of the optical couplers of said first array.

5. The optical device as recited in claim 4, wherein the wavelength add/drop multiplexer includes a waveguide segment that is adjacent and optically coupled to said one connecting planar optical waveguide that couples one of the optical couplers of said second array to the corresponding one of the optical couplers of said first array.

6. The optical device as recited in claim 5, wherein the wavelength add/drop multiplexer includes a heater located adjacent to a portion of the waveguide segment, the heater controlled to change the optical coupling to of an add/drop signal in the waveguide segment to said one connecting planar optical waveguide.

7. The optical device as recited in claim 1, wherein each of said optical grating couplers is separated from an adjacent one of said optical couplers by about 100 μm or less.

8. The optical device as recited in claim 1, wherein said optical grating couplers are 1-D pattern gratings.

9. The optical device as recited in claim 1, further comprising a multi-core fiber or an optical cable end-connected to the array; and
    wherein at least one of said optical grating couplers is configured to separate a received optical signal into a first polarization component and a second polarization component.

10. The optical device as recited in claim 1, further comprising a multi-core optical cable configured to optically end-couple each of a plurality of optical cores thereof to a corresponding one of said optical couplers.

11. The optical device as recited in claim 10, further comprising an optical source configured to produce a plurality of optical signal streams, in parallel, each of said plurality of optical signal streams being coupled to a corresponding one of said optical cores.

12. The optical device as recited in claim 1, further comprising a plurality of single-mode fibers, each single-mode fiber being optically coupled to one of said single-core optical couplers at an edge of the substrate.

13. The optical device as recited in claim 1, wherein each of said grating couplers of said first array and said second array each include trenches or pits formed in separate ones of said planar waveguides of said single-core fiber couplers.

14. A method, comprising:
    forming over a planar surface of a substrate a multi-core fiber coupler, said multi-core fiber coupler comprising an integrated first array of optical grating couplers, each grating coupler of said first array being located in the first array to optically couple to a corresponding optical core of a multi-core fiber or optical cable having an end facing and adjacent to the planar surface;
    forming a laterally separated and disjoint second array of optical grating couplers over the surface, some of the optical grating couplers of said second array being optically coupled to a corresponding optical grating couplers of said first array in a one-to-one manner by planar optical waveguides; and
    forming over said substrate a plurality of single-core fiber couplers, each single-core fiber coupler including a planar optical waveguide located over the surface and connecting a corresponding one of the optical grating couplers to an edge of the substrate.

15. The method as recited in claim 14, wherein each of said single-core fiber couplers includes an edge facet of one of said planar waveguides.

16. The method as recited in claim 14, wherein said optical couplers of said array are arranged in a regular hexagonal pattern.

17. The method as recited in claim 14, further comprising forming a wavelength add/drop multiplexer on said substrate and optically coupled to one of said planar optical waveguides that couple one of the optical couplers of said second array to the corresponding one of the optical couplers of said first array.

18. The method as recited in claim 17, wherein the wavelength add/drop multiplexer includes a waveguide segment that is adjacent and optically coupled to said one connecting planar optical waveguide that couples one of the optical couplers of said second array to the corresponding one of the optical couplers of said first array.

19. The method as recited in claim 18, wherein the wavelength add/drop multiplexer includes a heater located adjacent to a portion of the waveguide segment, the heater controlled to change the optical coupling to of an add/drop signal in the waveguide segment to said one connecting planar optical waveguide.

20. The method as recited in claim 14, wherein each of said optical couplers is separated from an adjacent one of said optical grating couplers by about 100 μm or less.

21. The method as recited in claim 14, wherein said optical couplers are 1-D pattern gratings.

22. The method as recited in claim 14, wherein at least one of said optical couplers is configured to separate an optical signal received from a multi-core optical fiber or optical cable into a first polarization component and a relatively orthogonal second polarization component.

23. The method as recited in claim 14, further comprising configuring a multi-core optical cable to optically couple each of a plurality of optical cores thereof to a corresponding one of said optical grating couplers.

24. The method as recited in claim 23, further comprising configuring an optical source to transmit each one of a plurality of optical signals via a corresponding one of said optical cores.

25. The method as recited in claim 14, further comprising configuring each of a plurality of single-mode fibers to optically couple to a corresponding one of said single-core optical couplers via an edge of the substrate.

\* \* \* \* \*